United States Patent
Manikantan Shila et al.

(10) Patent No.: US 10,319,160 B2
(45) Date of Patent: Jun. 11, 2019

(54) ANONYMOUS AND EPHEMERAL TOKENS TO AUTHENTICATE ELEVATOR CALLS

(71) Applicant: Otis Elevator Company, Farmington, CT (US)

(72) Inventors: Devu Manikantan Shila, West Hartford, CT (US); Paul A. Simcik, Southington, CT (US); Teems E. Lovett, Glastonbury, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 287 days.

(21) Appl. No.: 15/435,395

(22) Filed: Feb. 17, 2017

(65) Prior Publication Data
US 2017/0243417 A1    Aug. 24, 2017

Related U.S. Application Data

(60) Provisional application No. 62/296,835, filed on Feb. 18, 2016.

(51) Int. Cl.
| | |
|---|---|
| *B66B 1/34* | (2006.01) |
| *G07C 9/00* | (2006.01) |
| *B66B 1/46* | (2006.01) |
| *G06F 21/33* | (2013.01) |
| *H04L 29/06* | (2006.01) |

(Continued)

(52) U.S. Cl.
CPC .......... *G07C 9/00103* (2013.01); *B66B 1/468* (2013.01); *G06F 21/335* (2013.01); *H04L 63/0807* (2013.01); *H04L 63/0838* (2013.01); *H04L 63/108* (2013.01); *H04W 12/06* (2013.01); *B66B 2201/4653* (2013.01);

(Continued)

(58) Field of Classification Search
USPC .......................................................... 187/388
See application file for complete search history.

(56) References Cited

U.S. PATENT DOCUMENTS

| 6,397,976 B1 | 6/2002 | Hale et al. |
| 6,868,945 B2 | 3/2005 | Schuster et al. |

(Continued)

FOREIGN PATENT DOCUMENTS

| WO | 2014116182 A1 | 7/2014 |
| WO | 2015084396 A1 | 6/2015 |

OTHER PUBLICATIONS

European Search Report for application EP 17156234, dated Jul. 17, 2017, 10 pgs.

*Primary Examiner* — Christopher Uhlir
(74) *Attorney, Agent, or Firm* — Cantor Colburn LLP

(57) ABSTRACT

According to one or more embodiments, a system and method for authorizing a user securing an elevator call in a building is provided. For example, the method includes receiving, at a mobile device, a secure authorization token that includes an expiration time, connecting the mobile device to a backend system using the secure authorization token from the mobile device, verifying, using the backend system, an authenticity of the secure authorization token from the mobile device based on at least the expiration time, generating, at the backend system, a secure access token and a random number in response to the authenticity of the secure authorization token being verified, and receiving, at the mobile device, the secure access token and the random number for use making elevator call requests.

20 Claims, 7 Drawing Sheets

(51) Int. Cl.
*H04W 12/06* (2009.01)
*H04W 88/02* (2009.01)

(52) U.S. Cl.
CPC .............. *B66B 2201/4676* (2013.01); *G06F 2221/2137* (2013.01); *H04W 88/02* (2013.01)

(56) References Cited

U.S. PATENT DOCUMENTS

| | | |
|---|---|---|
| 6,986,408 B2 | 1/2006 | Takeuchi |
| 6,989,732 B2 | 1/2006 | Fisher |
| 7,134,024 B1* | 11/2006 | Binding ................ H04L 9/3234 |
| | | 713/187 |
| 7,347,303 B2 | 3/2008 | Kontturi et al. |
| 7,377,364 B2 | 5/2008 | Tyni et al. |
| 7,624,280 B2 | 11/2009 | Oskari |
| 7,624,433 B1 | 11/2009 | Clark et al. |
| 8,070,061 B2 | 12/2011 | Habraken |
| 8,151,942 B2 | 4/2012 | Rusanen et al. |
| 8,245,052 B2 | 8/2012 | Bjorn |
| 8,813,917 B2 | 8/2014 | Salmikuukka et al. |
| 9,118,656 B2 | 8/2015 | Ting et al. |
| 2002/0031230 A1 | 3/2002 | Sweet et al. |
| 2011/0030047 A1 | 2/2011 | Gao et al. |
| 2012/0159577 A1 | 6/2012 | Belinkiy et al. |
| 2014/0282882 A1 | 9/2014 | Tsui et al. |
| 2017/0270725 A1* | 9/2017 | Troesch .................. B66B 1/468 |
| 2018/0208430 A1* | 7/2018 | Koivisto .................. B66B 1/46 |

* cited by examiner

ANONYMOUS AND EPHEMERAL TOKENS TO AUTHENTICATE ELEVATOR CALLS

CROSS-REFERENCE TO RELATED APPLICATIONS

This application claims the benefit of U.S. provisional patent application Ser. No. 62/296,835, filed Feb. 18, 2016, the entire contents of which are incorporated herein by reference.

BACKGROUND

The subject matter disclosed herein generally relates to secure authorization tokens and, more particularly, to anonymous and ephemeral tokens for authenticating elevator hall calls.

Elevators can be controlled using a mobile device. The mobile device can be first loaded with any required application software. Using that application, a user can generate and send an elevator hall call message to the elevator control server. If the received elevator hall call message is authenticated, the elevator hall call will be processed and sent to an elevator controller. The elevator controller then calls an elevator car in response to receiving the authenticated elevator hall call message.

However, current implementations for processing in a secured manner are more vulnerable to attacks by one or more rogue agents, which are also sometimes called hackers. For example, in order to securely issue elevator hall calls remotely via a smartphone application, the current solutions propose the use of building specific sharable passcodes. Users will authenticate with the backend system that includes the elevator control system using these passcodes. However, these passcodes are meant to be easily shared between users and may therefore be used by a hacker to overload the system with hall calls in what is known as a denial of service attack. One proposed solution to these attacks is implementing intrusion detection of such an attack. However such intrusion detection requires storing user and/or device identification information leading to privacy issues. Accordingly, there exists a need for an anonymous authentication that may help address attacks by hackers.

BRIEF DESCRIPTION

According to one embodiment a method for authorizing a user securing an elevator call in a building is provided. The method includes receiving, at a mobile device, a secure authorization token that includes an expiration time, connecting the mobile device to a backend system using the secure authorization token from the mobile device, verifying, using the backend system, an authenticity of the secure authorization token from the mobile device based on at least the expiration time, generating, at the backend system, a secure access token and a random number in response to the authenticity of the secure authorization token being verified, and receiving, at the mobile device, the secure access token and the random number for use making elevator call requests.

In addition to one or more of the features described above, or as an alternative, further embodiments of the method may include wherein receiving, at the mobile device, the secure authorization token that includes the expiration time includes requesting, by a property manager, the secure authorization token from the backend system, generating, using the backend system, the secure authorization token, transmitting, from the backend system, the secure authorization token to the property manager, and transmitting, from the property manager, the secure authorization token to the mobile device.

In addition to one or more of the features described above, or as an alternative, further embodiments of the method may include wherein generating, using the backend system, the secure authorization token includes generating the secure authorization token using the expiration time and one or more of an expiration date, a current date, a current time, a building identification, a current user location, a user type, and user preferences.

In addition to one or more of the features described above, or as an alternative, further embodiments of the method may include wherein verifying, using the backend system, the authenticity of the secure authorization token from the mobile device based on at least the expiration time further includes, verifying the authenticity of the secure authorization token based on one or more of the expiration time and an expiration date, a current date, a current time, a building identification, a current user location, a user type, and user preferences.

In addition to one or more of the features described above, or as an alternative, further embodiments of the method may include wherein generating, at the backend system, a secure access token in response to the authenticity of the secure authorization token being verified includes including one or more of a long-term expiration time, a long-term expiration date, a temporary identifier, and a building identification in the secure access token, wherein the temporary identifier is generated using the building identification and a sequence number, and securing the secure access token using a building specific secret key (KID) to encrypt the secure access token.

In addition to one or more of the features described above, or as an alternative, further embodiments of the method may include storing, in a memory device of the mobile device, the secure access token and the random number, wherein the random number is a first random number, generating, at the mobile device, an elevator service request message based on a user input, transmitting, from the mobile device, the secure access token to the backend system in response to receiving the user input, verifying, at the backend system, the secure access token, generating, at the backend system, a second random number in response to verifying the secure access token, transmitting, from the backend system, the second random number to the mobile device, wherein the mobile device stores the second random number, transmitting, from the mobile device, the first random number along with the elevator service request message to the backend system, storing, at the backend system, the elevator service request message received from the mobile device in response to the first random number being verified, and transmitting, from the backend system, the elevator service request message to an elevator controller to call an elevator car in response to the first random number and the secure access token being verified.

In addition to one or more of the features described above, or as an alternative, further embodiments of the method may include storing, in a memory device of the mobile device, the secure access token and the first random number, generating, at the mobile device, an elevator service request message based on a user input, transmitting, from the mobile device, the elevator service request message to the backend system, storing, at the backend system, the elevator service request message received from the mobile device, generating, at the backend system, a second random number in response to receiving the elevator service request message, transmitting, from the backend system, the second random number to the mobile device, wherein the mobile device stores the second random number, transmitting, from the mobile device, the first random number along with the secure access token to the backend system, verifying, at the backend system, the first random number and the secure access token, and transmitting, from the backend system, the elevator service request message to an elevator controller to call an elevator car in response to the first random number and the secure access token being verified.

In addition to one or more of the features described above, or as an alternative, further embodiments of the method may include wherein the backend system includes one or more of a server, a server blade, a server rack, a server farm, a distributed server, and a multi-node distributed processing network of computers.

In addition to one or more of the features described above, or as an alternative, further embodiments of the method may include wherein the mobile device is located within a proximate distance of the building that the user is securing an elevator call in, wherein the property manager is located off-site from the building, and wherein the backend system is located in a cloud environment connecting to the mobile device and property manager over one or more networks.

According to one embodiment a system for authorizing a user securing an elevator call in a building is provided. The system includes a mobile device that receives a secure authorization token that includes an expiration time, connects to a backend system using the secure authorization token, and receives a secure access token and a first random number for use making elevator call requests using an elevator service request message that is generated by the mobile device, a backend system that verifies an authenticity of the secure authorization token from the mobile device based on at least the expiration time, and generates the secure access token and the first random number in response to the authenticity of the secure authorization token being verified, a property manager that requests the secure authorization token from the backend system, and transmits the secure authorization token from the backend system to the mobile device, an elevator controller that receives the elevator service request message generated by the mobile device, and an elevator car that is controlled by the elevator controller based on the elevator service request message.

In addition to one or more of the features described above, or as an alternative, further embodiments of the system may include wherein the secure authorization token includes one or more of the expiration time, an expiration date, a current date, a current time, a building identification, a current user location, a user type, and user preferences.

In addition to one or more of the features described above, or as an alternative, further embodiments of the system may include wherein the backend system verifies the authenticity of the secure authorization token based on one or more of the expiration time and an expiration date, a current date, a current time, a building identification, a current user location, a user type, and user preferences.

In addition to one or more of the features described above, or as an alternative, further embodiments of the system may include wherein the backend system includes in the secure access token one or more of a long-term expiration time, a long-term expiration date, a temporary identifier, and a building identification in the secure access token, wherein the temporary identifier is generated using the building identification and a sequence number, and wherein the backend system secures the secure access token using a building specific secret key (KID) to encrypt the secure access token In addition to one or more of the features described above, or as an alternative, further embodiments of the system may include wherein the system is further configured to store, in a memory device of the mobile device, the secure access token and the first random number, generate, at the mobile device, an elevator service request message based on a user input, transmit, from the mobile device, the secure access token to the backend system in response to receiving the user input, verify, at the backend system, the secure access token, generate, at the backend system, a second random number in response to verifying the secure access token, transmit, from the backend system, the second random number to the mobile device, wherein the mobile device stores the second random number, transmit, from the mobile device, the first random number along with the elevator service request message to the backend system, store, at the backend system, the elevator service request message received from the mobile device in response to the first random number being verified, and transmit, from the backend system, the elevator service request message to an elevator controller to call an elevator car in response to the first random number and the secure access token being verified.

In addition to one or more of the features described above, or as an alternative, further embodiments of the system may include wherein the system is further configured to store, in a memory device of the mobile device, the secure access token and the first random number, generate, at the mobile device, an elevator service request message based on a user input, transmit, from the mobile device, the elevator service request message to the backend system, store, at the backend system, the elevator service request message received from the mobile device, generate, at the backend system, a second random number in response to receiving the elevator service request message, transmit, from the backend system, the second random number to the mobile device, wherein the mobile device stores the second random number, transmit, from the mobile device, the first random number along with the secure access token to the backend system, verify, at the backend system, the first random number and the secure access token, and transmit, from the backend system, the elevator service request message to an elevator controller to call an elevator car in response to the first random number and the secure access token being verified.

In addition to one or more of the features described above, or as an alternative, further embodiments of the system may include wherein the backend system includes one or more of a server, a server blade, a server rack, a server farm, a distributed server, and a multi-node distributed processing network of computers.

In addition to one or more of the features described above, or as an alternative, further embodiments of the system may include wherein the mobile device is located within a proximate distance of the building that the user is securing an elevator call in, wherein the property manager is located off-site from the building, and wherein the backend system is located in a cloud environment connecting to the mobile device and property manager over one or more networks.

According to one embodiment a computer program product for authorizing a user securing an elevator call in a building is provided. The computer program product including a computer readable storage medium having program instructions embodied therewith. The program instructions executable by a processor to cause the processor to receive, at a mobile device, a secure authorization token that includes an expiration time, connect the mobile device to a backend system using the secure authorization token from the mobile device, verify, using the backend system, an authenticity of the secure authorization token from the mobile device based on at least the expiration time, generate, at the backend system, a secure access token and a first random number in response to the authenticity of the secure authorization token being verified, and receive, at the mobile device, the secure access token and the first random number for use making elevator call requests.

In addition to one or more of the features described above, or as an alternative, further embodiments of the computer program product may include additional program instructions executable by a processor to cause the processor to store, in a memory device of the mobile device, the secure access token and the first random number, generate, at the mobile device, an elevator service request message based on a user input, transmit, from the mobile device, the secure access token to the backend system in response to receiving the user input, verify, at the backend system, the secure access token, generate, at the backend system, a second random number in response to verifying the secure access token, transmit, from the backend system, the second random number to the mobile device, wherein the mobile device stores the second random number, transmit, from the mobile device, the first random number along with the elevator service request message to the backend system, store, at the backend system, the elevator service request message received from the mobile device in response to the first random number being verified, and transmit, from the backend system, the elevator service request message to an elevator controller to call an elevator car in response to the first random number and the secure access token being verified.

In addition to one or more of the features described above, or as an alternative, further embodiments of the computer program product may include wherein receiving, at the mobile device, the secure authorization token that includes the expiration time includes requesting, by a property manager, the secure authorization token from the backend system, generating, using the backend system, the secure authorization token, wherein generating the secure authorization token uses the expiration time and one or more of an expiration date, a current date, a current time, a building identification, a current user location, a user type, and user preferences, transmitting, from the backend system, the secure authorization token to the property manager, and transmitting, from the property manager, the secure authorization token to the mobile device.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Figure 1:
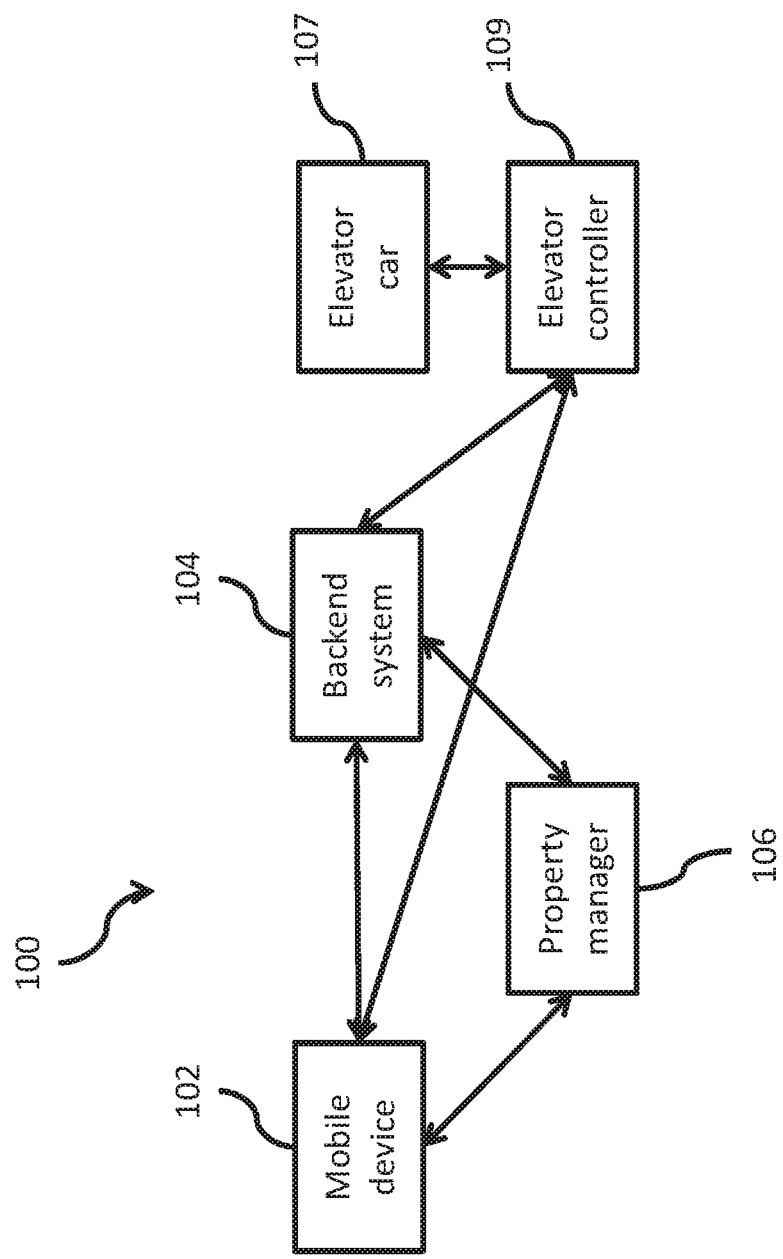
FIG. 1 depicts is a block diagram of a system for authorizing a user securing an elevator call in a building in accordance with one or more exemplary embodiments.

As shown and described herein, various features of the disclosure will be presented. Various embodiments may have the same or similar features and thus the same or similar features may be labeled with the same reference numeral, but preceded by a different first number indicating the figure to which the feature is shown. Thus, for example, element "a" that is shown in FIG. X may be labeled "Xa" and a similar feature in FIG. Z may be labeled "Za." Although similar reference numbers may be used in a generic sense, various embodiments will be described and various features may include changes, alterations, modifications, etc. as will be appreciated by those of skill in the art, whether explicitly described or otherwise would be appreciated by those of skill in the art.

One or more embodiments described herein are directed to a method and/or system for authorizing a user that is attempting to secure an elevator call in a building. The system includes a mobile device, a backend system, a property manager, an elevator controller, and elevator car. In one or more embodiments, the property manager may be whatever entity controls and manages access to the elevator independent of the location or use of the elevator such as, for example, a building manager, a building owner, or may specifically be an elevator manager for a particular elevator or elevator system. This method and system could provide improved protection against hackers while maintaining anonymous privacy setting for users. The system and method could also provide an improved passenger experience and reduce boarding times while protecting the system from attackers. For example, according to one or more embodiments, an ephemeral secure token that expires with time and that cannot be shared with others may be provided. Further, anonymous identification of users and/or devices and active intrusion detection may be provided without affecting user privacy.

Turning now to FIG. 1, a block diagram of a system 100 for authorizing a user securing an elevator call in a building is shown in accordance with one or more exemplary embodiments. The system 100 includes a mobile device 102 that is communicatively connected to a backend system 104 and a property manager 106. The backend system 104 is also connected to the property manager 106. Further, the backend system 104 is communicatively connected to a building elevator system that includes an elevator controller 109 and an elevator car 107.

According to one embodiment, the mobile device 102 may be a smartphone. Further, according to one or more embodiments the mobile device 102 may be any one of a tablet, a notebook, a netbook, a wearable electronic, a special purpose FOB, or some other device. The backend system 104 may be a single server that is located off-site from the building and elevator system that it controls. Alternatively, the backend system 104 may be located on-site within the building. For example, the backend system 104 may be located in a server room within the building, the backend system 104 may be placed in a distributed fashion in multiple server rooms, or the backend system 104 may be located near, on, or within the elevator system that the backend system 104 controls. According to other embodiments, the backend system 104 may include one or more of a server, a server blade, a server rack, a server farm, a distributed server, and a multi-node distributed processing network of computers. The property manager 106 may also be located either on-site or off-site. In either case the property manager user may access the property manager 106 through a computer terminal and a web portal through which the property manager user may access and control the authentication process in part as described below. The elevator system that includes an elevator controller 109 and at least one elevator car 107 may include multiple elevator cars that are controlled by either one elevator controller or by individual controllers for each car. The elevator car 107 and elevator controller 109 may be part of roped or ropeless elevator system. The elevator controller 109 may be installed on or within the elevator car 107. Alternatively, the elevator controller 109 may be installed in a stationary location that is not in the elevator cars 107.

In this arrangement a communication path exists between the mobile device 102 and both the property manager 106 and the backend system 104. The backend system 104, in turn, is connected to the elevator controller 109 and elevator car 107. Accordingly, any user using the mobile device communicates through, and is authenticated by, the backend system 104 before any elevator request is transmitted and granted.

According to another embodiment, the authentication and authorization systems and operations may be included in and executed by the elevator controller 109 with which a mobile device 102 may communicate with directly. Further, according to another embodiment, the elevator controller 109 may also include the property manager 106 system and operations such that the mobile device 102 may also directly communicate with the elevator controller to execute the operations provided by the property manager 106.

Figure 2:
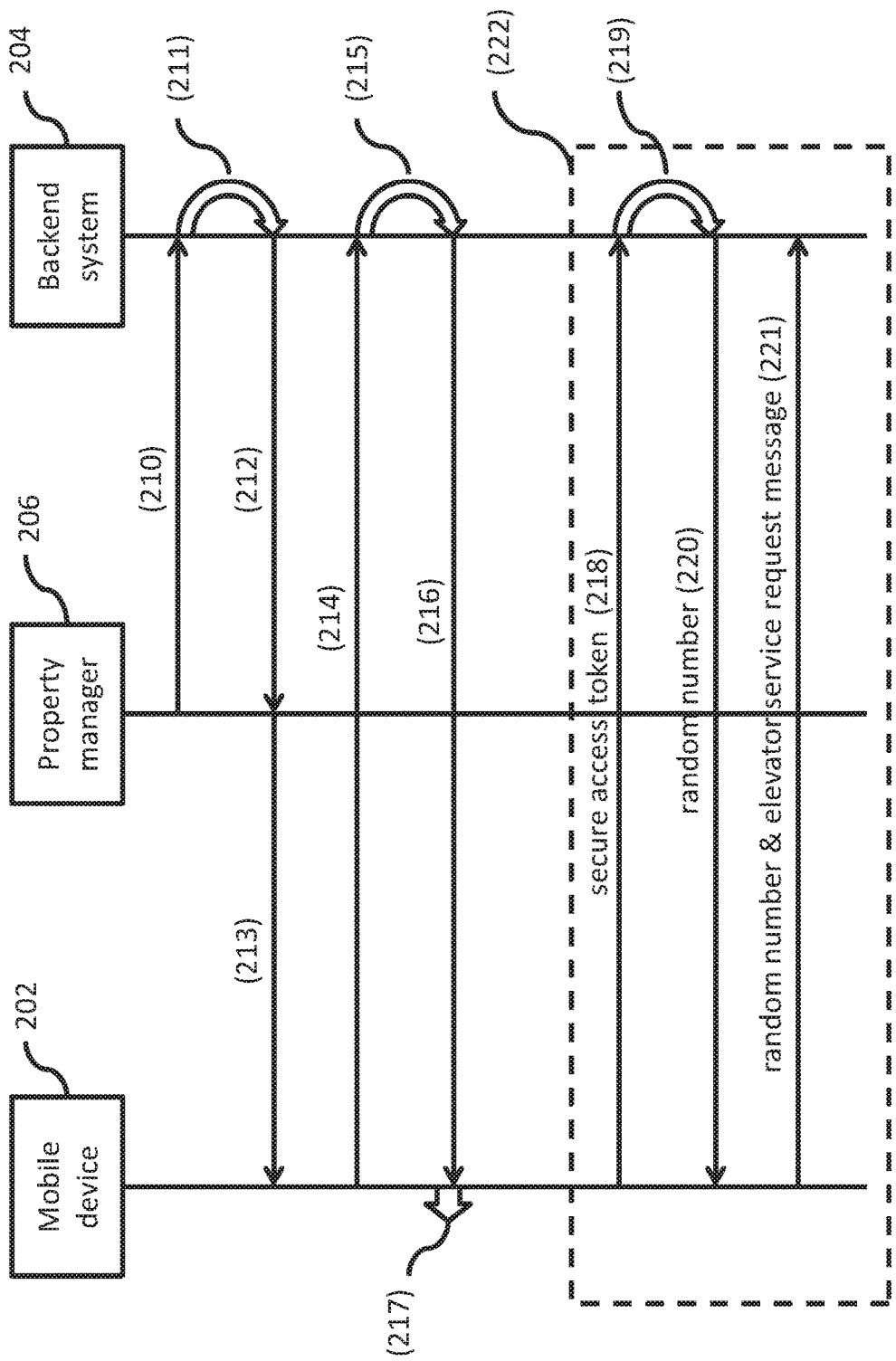
FIG. 2 depicts a communication flowchart between elements of a system for authorizing a user securing an elevator call in a building in accordance with an exemplary embodiment.

FIG. 2 depicts a communication flowchart between elements of a system for authorizing a user securing an elevator call in a building in accordance with an exemplary embodiment. The flowchart includes a mobile device 202 that may communicate with both a backend system 204 and a property manager 206. Initially, the property manager 206 requests a secure authorization token from the backend system 204 (operation 210). The backend system 204, which may also be referred to as a server 204, then generates the secure authorization token (operation 211). The secure authorization token may be generated using an element value that provides the secure authorization token with a limited duration providing the token with an ephemeral quality. For example, the secure authorization token may be generated using an element value that includes one or more of a building identification (ID), an expiration time, an expiration date, a current date, a current time, a current user location, a user type, and user preferences. The secure authorization token is then transmitted to the property manager 206 that requested it (operation 212). The property manager 206 then forwards on the secure authorization token to the mobile device 202 (operation 213). The device 202 then connects to the backend system 204 using the secure authorization token (operation 214). The server then handles verifying the authenticity of the secure authorization token and generates a secure access token when verification is possible (operation 215). This secure access token is then transmitted to the mobile device 202 (operations 216). The secure access token is then automatically stored along with other application data on the mobile device (operation 217).

After these operations the system is ready to begin an approval process of an elevator service request message from the mobile device 202 (operation 222). The approval process as shown sends a token and gets verified before sending a service request. Specifically, the mobile device 202 sends the secure access token to the backend system 204 (operation 218). The backend system 204 verifies the secure access token (operation 219) and then returns a generated random number to the mobile device (operation 220). The mobile device 202 then transmits back the random number along with the elevator service request message (operation 221).

Figure 3:
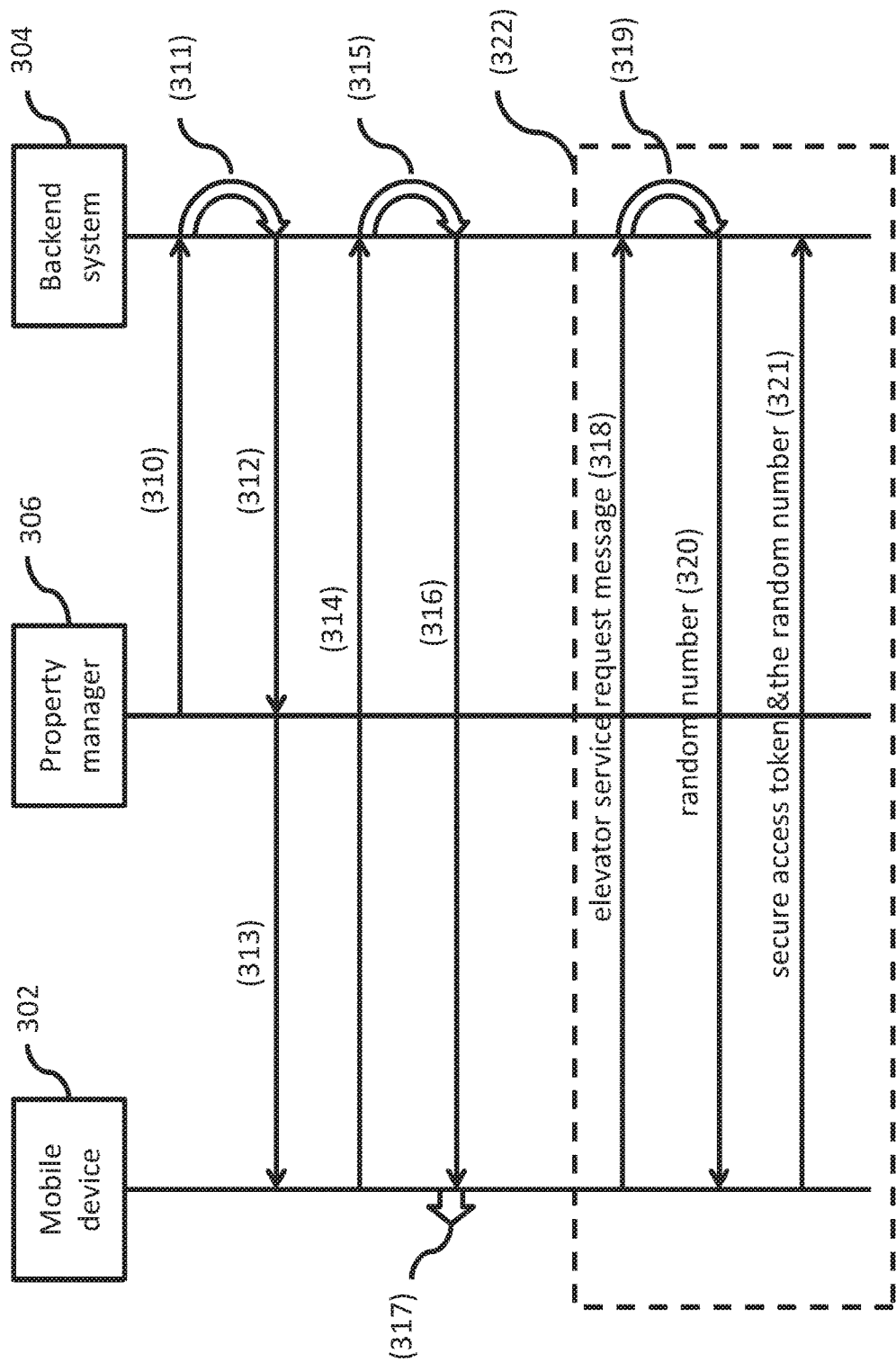
FIG. 3 depicts a communication flowchart between elements of a system for authorizing a user securing an elevator call in a building in accordance with an exemplary embodiment.

FIG. 3 depicts a communication flowchart between elements of a system for authorizing a user securing an elevator call in a building in accordance with an exemplary embodiment. As show, operations 310 through 317 are substantially similar to operations 210 through 217 of FIG. 2. In contrast, the operations 318 through 321 are different from operation 218 and 321 of FIG. 2 as explained below.

Specifically, the flowchart includes a mobile device 302 that may communicate with both a backend system 304 and a property manager 306. Initially, the property manager 306 requests a secure authorization token from the backend system 304 (operation 310). The backend system 304, which may also be referred to as a server 304, then generates the secure authorization token (operation 311). The secure authorization token may be generated using one or more of a building identification (ID), an expiration time, an expiration date, a current date, a current time, a current user location, a user type, and user preferences. The secure authorization token is then transmitted to the property manager 306 that requested it (operation 312). The property manager 306 then forwards on the secure authorization token to the mobile device 302 (operation 313). The device 302 then connects to the backend system 304 using the secure authorization token (operation 314). The server then handles verifying the authenticity of the secure authorization token and generates a secure access token when verification is possible (operation 315). This secure access token is then transmitted to the mobile device 302 (operations 316). The secure access token is then automatically stored along with other application data on the mobile device (operation 317).

After these operations the system is ready to begin an approval process of an elevator service request message from the mobile device 302 (operation 322). This approval process varies from that of FIG. 2 in that the approval process first sends a request and then verifies after by sending the token and random number. Specifically, the mobile device 302 may use the loaded application software to send the elevator service request message to the backend system (operation 318). The backend system generates a random number in response to receiving the message (operations 319). The backend system 304 then transmits the random number to the mobile device (operation 320). The mobile device 302 then provides the secure access token and the random number to the backend system 304 (operation 321).

Figure 4:
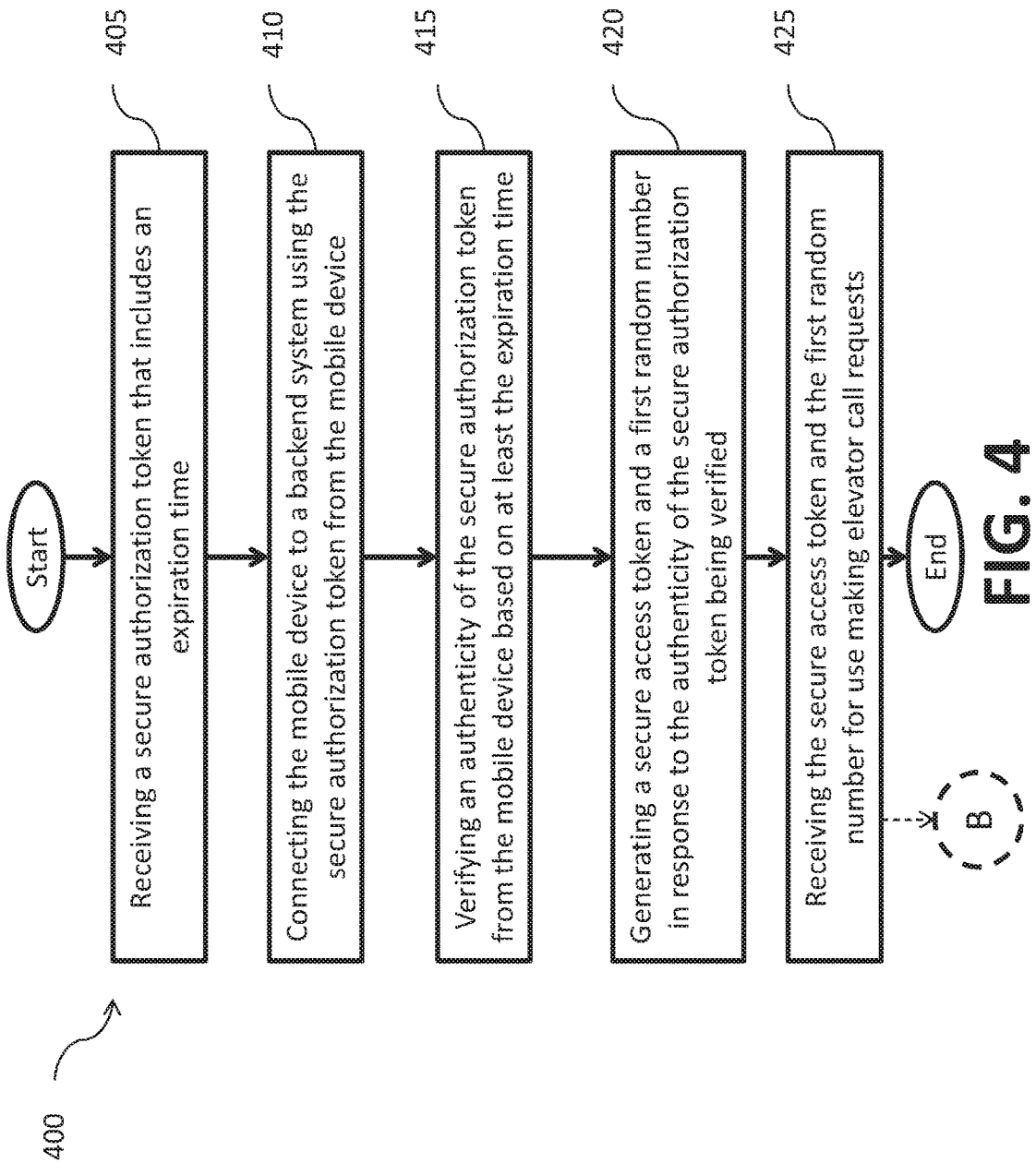
FIG. 4 depicts a flowchart of a method for authorizing a user securing an elevator call in a building in accordance with an exemplary embodiment.

FIG. 4 depicts a flowchart of a method 400 for authorizing a user securing an elevator call in a building in accordance with an exemplary embodiment. The method includes receiving, at a mobile device, a secure authorization token that includes an expiration time (operation 405). The method also includes connecting the mobile device to a backend system using the secure authorization token from the mobile device (operation 410). Further, the method includes verifying, using the backend system, an authenticity of the secure authorization token from the mobile device based on at least the expiration time (operation 415). The method then includes generating, at the backend system, a secure access token and a first random number in response to the authenticity of the secure authorization token being verified (operation 420). Finally, the method may conclude after receiving, at the mobile device, the secure access token and the first random number for use making elevator call requests (operation 425). According to one or more embodiments, the method may not conclude at this point as indicated by continuing element "B" as shown, which picks up the method in FIGS. 6 and 7.

Figure 5:
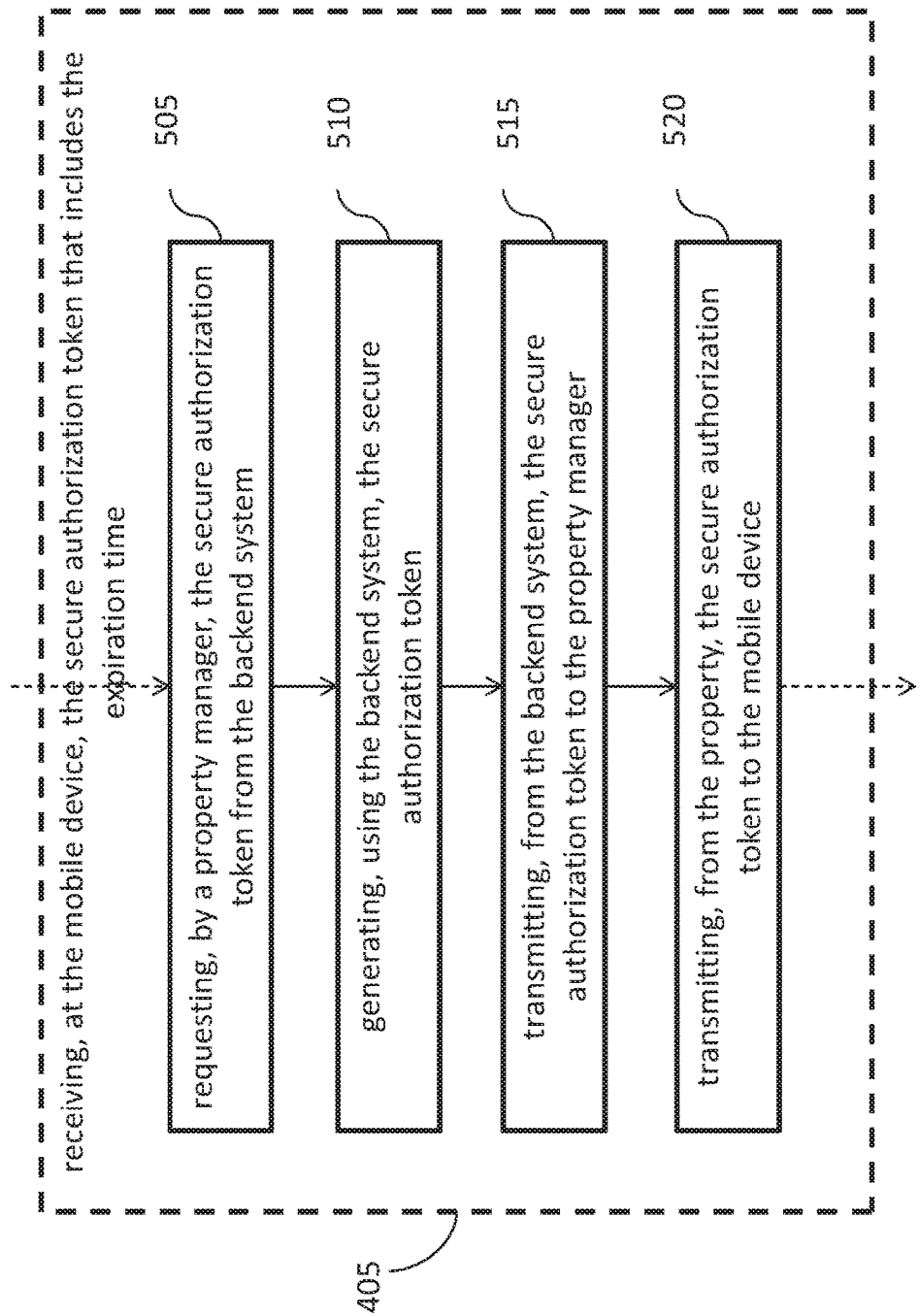
FIG. 5 depicts a flowchart showing the steps that make up a method step for authorizing a user securing an elevator call in a building in accordance with an exemplary embodiment.

FIG. 5 depicts a flowchart showing the steps that make up a method step for authorizing a user securing an elevator call in a building in accordance with an exemplary embodiment. Specifically, receiving, at the mobile device, the secure authorization token that includes the expiration time may further include requesting, by a property manager, the secure authorization token from the backend system (operation 505). The method may also include generating, using the backend system, the secure authorization token (operation 510). Further the method includes transmitting, from the backend system, the secure authorization token to the property manager (operation 515). The method also includes transmitting, from the property manager, the secure authorization token to the mobile device (operations 520).

Figure 6:
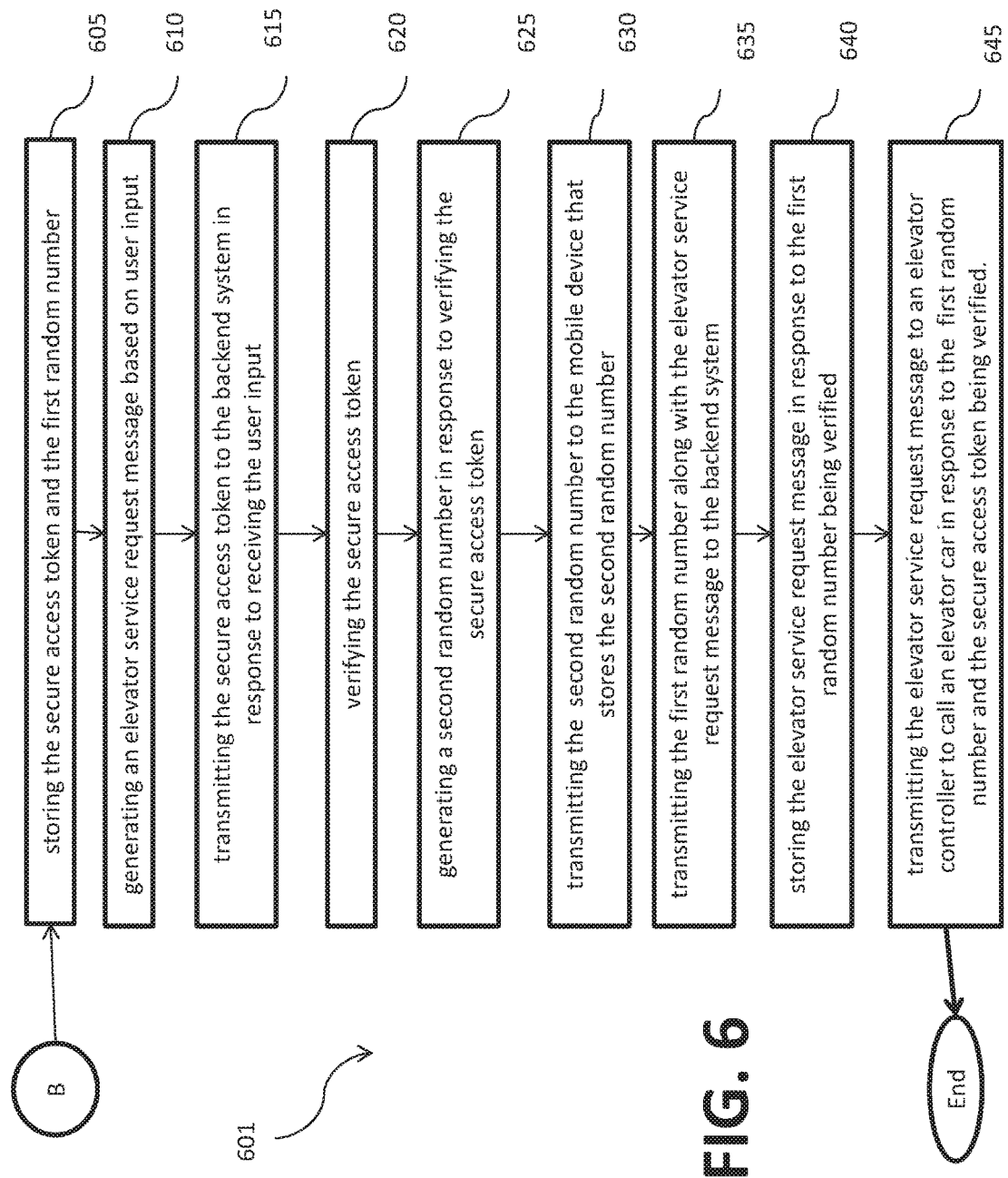
FIG. 6 depicts a flowchart of additional method steps for authorizing a user securing an elevator call in a building in accordance with an exemplary embodiment.

FIG. 6 depicts a flowchart of additional method operations 601 for authorizing a user securing an elevator call in a building in accordance with an exemplary embodiment. Particularly, these steps pick up from the circle labeled "B" on FIG. 4 which is the same "B" shown on FIG. 6.

Accordingly, the method further includes storing, in a memory device of the mobile device, the secure access token and the first random number (operation 605). The method also includes generating, at the mobile device, an elevator service request message based on a user input (operation 610) and transmitting, from the mobile device, the secure access token to the backend system in response to receiving the user input (operation 615). The method also includes verifying, at the backend system, the secure access token (operation 620) and generating, at the backend system, a second random number in response to verifying the secure access token (operations 625). Further, the method includes transmitting, from the backend system, the second random number to the mobile device, wherein the mobile device stores the second random number (operation 630) and transmitting, from the mobile device, the first random number along with the elevator service request message to the backend system (operations 635). Finally, the method may further include storing, at the backend system, the elevator service request message received from the mobile device in response to the first random number being verified (operation 640), and transmitting, from the backend system, the elevator service request message to an elevator controller to call an elevator car in response to the first random number and the secure access token being verified (operation 645).

Figure 7:
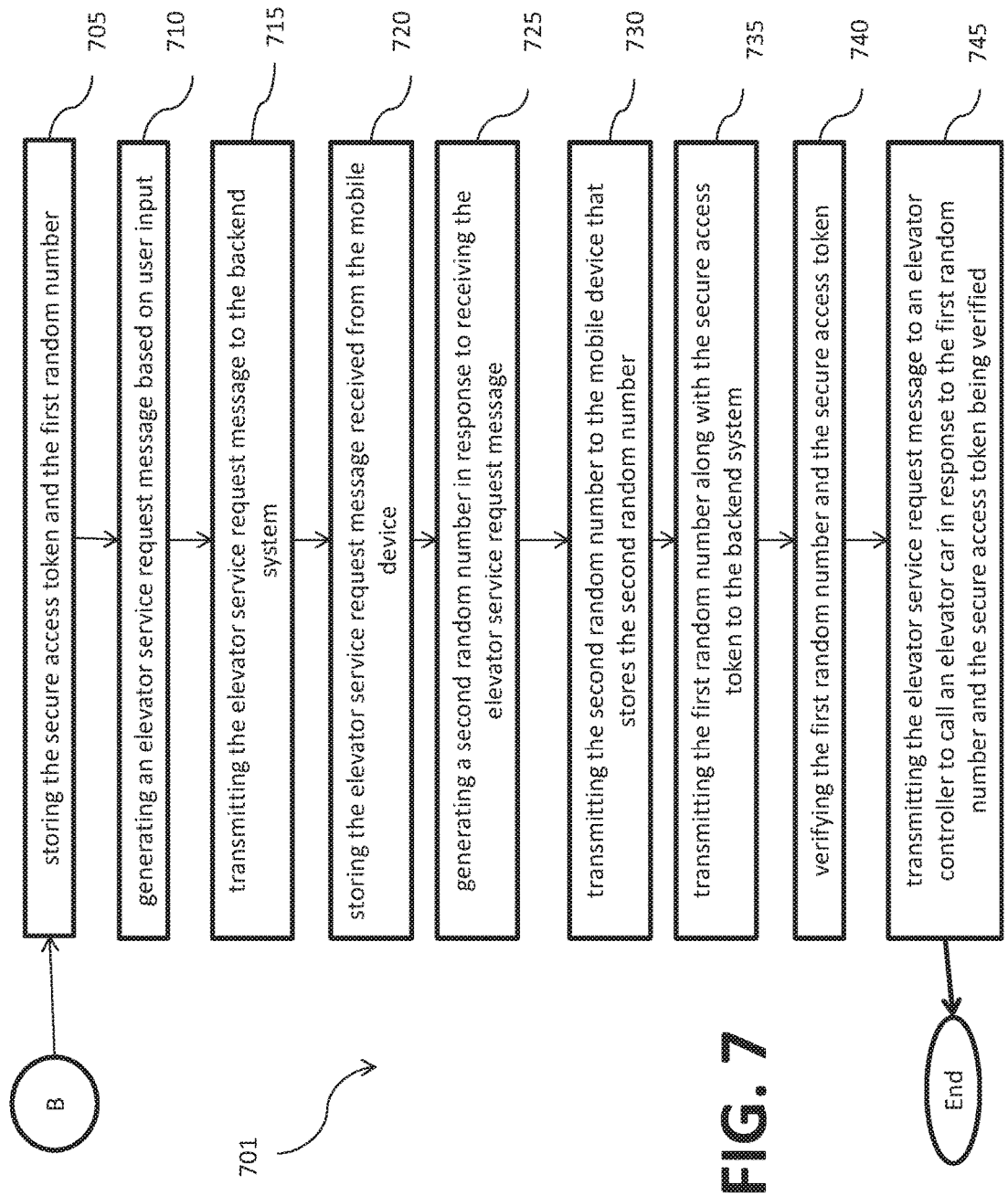
FIG. 7 depicts a flowchart of additional method steps for authorizing a user securing an elevator call in a building in accordance with an exemplary embodiment.

FIG. 7 depicts a flowchart of additional method operations 701 for authorizing a user securing an elevator call in a building in accordance with an exemplary embodiment. Particularly, these steps pick up from the circle labeled "B" on FIG. 4 which is the same "B" shown on FIG. 7.

Accordingly, the method further includes storing, in a memory device of the mobile device, the secure access token and the first random number (operation 705) and generating, at the mobile device, an elevator service request message based on a user input (operation 710). The method also includes transmitting, from the mobile device, the elevator service request message to the backend system (operation 715) and storing, at the backend system, the elevator service request message received from the mobile device (operation 720). Further, the method includes generating, at the backend system, a second random number in response to receiving the elevator service request message (operation 725) and transmitting, from the backend system, the second random number to the mobile device, wherein the mobile device stores the second random number (operation 730). The method also includes transmitting, from the mobile device, the first random number along with the secure access token to the backend system (operation 735) and verifying, at the backend system, the first random number and the secure access token (operation 740). Finally, the method includes transmitting, from the backend system, the elevator service request message to an elevator controller to call an elevator car in response to the first random number and the secure access token being verified (operation 745).

While the present disclosure has been described in detail in connection with only a limited number of embodiments, it should be readily understood that the present disclosure is not limited to such disclosed embodiments. Rather, the present disclosure may be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

For example, according to one or more embodiments, an approach may begin with providing a user with an ephemeral token called secure authorization token. The token may be provided by the property manager, which may be the building owner/manager. The token may consist of the following information: (a) Building ID (b) Current date (c) Time of expiration; (d) Other features or attributes such as user type, user preference. The token may be secured with a building specific secret key stored only at the back end system. The user may then initially use the secure authorization token to authenticate to the backend system. The backend system will use the secret key, which may also be called a building specific secret key ($K_{ID}$), to decrypt the information to validate the token. Validation may then be mainly performed based on the building ID, current user location, expiration time, current date etc. if the information is valid, the backend system will create another token called secure access token to the smartphone for issuing the elevator calls. Secure access token may contain the following information such as building ID, expiration date and time, other attributes. Secure access token may be secured with the building secret key present only at the backend system. A smartphone app will securely store this token in its data store and use it to connect to the system. To make the system more secure, a multifactor authentication system will be used: (a) App sends the secure access token to the backend system; (b) backend system verifies it and send a random number; (c) App sends back the random number to the device with the car and hall call messages. The generation of random number by the backend system helps to avoid reuse or replay of the communication. For example, a possible attack may be mitigated by limiting the number of calls made by an authorized user given the time duration.

Further, according to one or more embodiments, in order to identify the person, the secure access token may also include a temporary identifier made from the Building ID and a sequence number. This temporary identifier may be later used by the intrusion detection algorithm running at the server to blacklist malicious users.

According to one or more embodiments receiving, at the mobile device, the secure authorization token that includes the expiration time may include a number of processes to help accomplish receiving the secure authorization token. Particularly, a process that is includes is requesting, by a property manager, the secure authorization token from the backend system. Another process that is included is generating, using the backend system, the secure authorization token. Further, transmitting, from the backend system, the secure authorization token to the property manager, and transmitting, from the property manager, the secure authorization token to the mobile device are also included.

According to one or more embodiments generating, using the backend system, the secure authorization token specifically includes generating the secure authorization token using the expiration time and one or more of an expiration date, a current date, a current time, a building identification, a current user location, a user type, and user preferences.

According to one or more embodiments, verifying, using the backend system, the authenticity of the secure authorization token from the mobile device based on at least the expiration time further includes verifying the authenticity of the secure authorization token based on one or more of the expiration time and an expiration date, a current date, a current time, a building identification, a current user location, a user type, and user preferences.

According to one or more embodiments, generating, at the backend system, a secure access token in response to the authenticity of the secure authorization token being verified provides including one or more of a long-term expiration time, a long-term expiration date, a temporary identifier, and a building identification in the secure access token, wherein the temporary identifier is generated using the building identification and a sequence number and securing the secure access token using a building specific secret key (KID) to encrypt the secure access token.

According to another embodiment, the backend system includes one or more of a server, a server blade, a server rack, a server farm, a distributed server, and a multi-node distributed processing network of computers.

According to one or more embodiments, the mobile device is located within a proximate distance of the building that the user is securing an elevator call in. Further, according to an embodiment, the property manager is located off-site from the building, and the backend system is located in a cloud environment connecting to the mobile device and property manager over one or more networks.

According to one or more embodiments, a user may specify both a starting floor and a destination floor. This will result in sending a request for both a hall call message, and also a car call message corresponding to the starting and destination floors respectively. To accomplish such a request what is created is an 'elevator service request message' that includes both a 'hall call message' or 'hall calls' and 'car call message' or 'car calls.' Further, in one or more embodiments, the elevator service request message may be defined to contain parameters including but not limited to: starting floor, destination floor, and front or rear door use. Thus, in one or more embodiments, the purpose of the elevator service request message is to summon an elevator to the requested starting floor with a hall call, followed by the elevator activating a car call to the requested destination floor.

Accordingly, the benefits of one or more of the above discussed embodiments are many fold: (a) secure-token based technique to issue elevator calls in a secure manner; (b) Blacklisting of users in an anonymous fashion; and (c) Protection from reuse or replay of the communication.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description has been presented for purposes of illustration and description, but is not intended to be exhaustive or limited to the embodiments in the form disclosed. Many modifications and variations will be apparent to those of ordinary skill in the art without departing from the scope of the disclosure. The embodiments were chosen and described in order to best explain the principles of the disclosure and the practical application, and to enable others of ordinary skill in the art to understand various embodiments with various modifications as are suited to the particular use contemplated.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present invention are described herein with reference to flowchart illustrations and/or block diagrams of methods, apparatus (systems), and computer program products according to embodiments. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Accordingly, the present disclosure is not to be seen as limited by the foregoing description, but is only limited by the scope of the appended claims.

What is claimed is:

1. A method for authorizing a user securing an elevator call in a building, the method comprising:
    requesting, by a property manager, a secure authorization token that includes an expiration time from a backend system;
    transmitting, from the property manager, the secure authorization token to a mobile device;
    connecting a backend system to the mobile device using the secure authorization token;
    verifying, using the backend system, an authenticity of the secure authorization token from the mobile device based on at least the expiration time;

generating, at the backend system, a secure access token and a random number in response to the authenticity of the secure authorization token being verified; and sending, to the mobile device, the secure access token and the random number for use in making elevator call requests.

2. The method of claim 1, wherein:

the backend system generates the secure authorization token; and the backend system transmits the secure authorization token to the property manager.

3. The method of claim 2, wherein generating, using the backend system, the secure authorization token comprises:

generating the secure authorization token using the expiration time and one or more of an expiration date, a current date, a current time, a building identification, a current user location, a user type, and user preferences.

4. The method of claim 1, wherein verifying, using the backend system, the authenticity of the secure authorization token from the mobile device based on at least the expiration time further comprises:

verifying the authenticity of the secure authorization token based on one or more of the expiration time and an expiration date, a current date, a current time, a building identification, a current user location, a user type, and user preferences.

5. The method of claim 1, wherein generating, at the backend system, a secure access token in response to the authenticity of the secure authorization token being verified comprises:

including one or more of a long-term expiration time, a long-term expiration date, a temporary identifier, and a building identification in the secure access token, wherein the temporary identifier is generated using the building identification and a sequence number; and securing the secure access token using a building specific secret key ($K_{ID}$) to encrypt the secure access token.

6. The method of claim 1, further comprising:

storing, in a memory device of the mobile device, the secure access token and the random number, wherein the random number is a first random number;

generating, at the mobile device, an elevator service request message based on a user input;

transmitting, from the mobile device, the secure access token to the backend system in response to receiving the user input;

verifying, at the backend system, the secure access token;

generating, at the backend system, a second random number in response to verifying the secure access token;

transmitting, from the backend system, the second random number to the mobile device, wherein the mobile device stores the second random number;

transmitting, from the mobile device, the first random number along with the elevator service request message to the backend system;

storing, at the backend system, the elevator service request message received from the mobile device in response to the first random number being verified; and transmitting, from the backend system, the elevator service request message to an elevator controller to call an elevator car in response to the first random number and the secure access token being verified.

7. The method of claim 1, further comprising:

storing, in a memory device of the mobile device, the secure access token and the random number, wherein the random number is a first random number;

generating, at the mobile device, an elevator service request message based on a user input;

transmitting, from the mobile device, the elevator service request message to the backend system;

storing, at the backend system, the elevator service request message received from the mobile device;

generating, at the backend system, a second random number in response to receiving the elevator service request message;

transmitting, from the backend system, the second random number to the mobile device, wherein the mobile device stores the second random number;

transmitting, from the mobile device, the first random number along with the secure access token to the backend system;

verifying, at the backend system, the first random number and the secure access token; and transmitting, from the backend system, the elevator service request message to an elevator controller to call an elevator car in response to the first random number and the secure access token being verified.

8. The method of claim 1, wherein the backend system comprises one or more of a server, a server blade, a server rack, a server farm, a distributed server, and a multi-node distributed processing network of computers.

9. The method of claim 1, wherein the mobile device is located within a proximate distance of the building that the user is securing an elevator call in, wherein the property manager is located off-site from the building, and wherein the backend system is located in a cloud environment connecting to the mobile device and property manager over one or more networks.

10. A system for authorizing a user securing an elevator call in a building, the system comprising:

a backend system that generates a secure authorization token that includes an expiration time;

a property manager that requests the secure authorization token from the backend system, and transmits the secure authorization token from the backend system to a mobile device;

the backend system configured to connect with the mobile device;

the backend system configured to verify an authenticity of the secure authorization token from the mobile device based on at least the expiration time, the backend system configured to generate a secure access token and a first random number in response to the authenticity of the secure authorization token being verified, the backend system configured to transmit the secure access token and the first random number to the mobile device for use in generating an elevator service request message;

an elevator controller that receives the elevator service request message generated by the mobile device; and an elevator car that is controlled by the elevator controller based on the elevator service request message.

11. The system of claim 10, wherein the secure authorization token comprises one or more of the expiration time, an expiration date, a current date, a current time, a building identification, a current user location, a user type, and user preferences.

12. The system of claim 10, wherein the backend system verifies the authenticity of the secure authorization token based on one or more of the expiration time and an expiration date, a current date, a current time, a building identification, a current user location, a user type, and user preferences.

13. The system of claim 10, wherein the backend system includes in the secure access token one or more of a long-term expiration time, a long-term expiration date, a temporary identifier, and a building identification in the secure access token, wherein the temporary identifier is generated using the building identification and a sequence number, and wherein the backend system secures the secure access token using a building specific secret key ($K_{ID}$) to encrypt the secure access token.

14. The system of claim 10, wherein the system is further configured to:
store, in a memory device of the mobile device, the secure access token and the first random number;
generate, at the mobile device, an elevator service request message based on a user input;
transmit, from the mobile device, the secure access token to the backend system in response to receiving the user input;
verify, at the backend system, the secure access token;
generate, at the backend system, a second random number in response to verifying the secure access token;
transmit, from the backend system, the second random number to the mobile device, wherein the mobile device stores the second random number;
transmit, from the mobile device, the first random number along with the elevator service request message to the backend system;
store, at the backend system, the elevator service request message received from the mobile device in response to the first random number being verified; and
transmit, from the backend system, the elevator service request message to an elevator controller to call an elevator car in response to the first random number and the secure access token being verified.

15. The system of claim 10, wherein the system is further configured to:
store, in a memory device of the mobile device, the secure access token and the first random number;
generate, at the mobile device, an elevator service request message based on a user input;
transmit, from the mobile device, the elevator service request message to the backend system;
store, at the backend system, the elevator service request message received from the mobile device;
generate, at the backend system, a second random number in response to receiving the elevator service request message;
transmit, from the backend system, the second random number to the mobile device, wherein the mobile device stores the second random number;
transmit, from the mobile device, the first random number along with the secure access token to the backend system;
verify, at the backend system, the first random number and the secure access token; and
transmit, from the backend system, the elevator service request message to an elevator controller to call an elevator car in response to the first random number and the secure access token being verified.

16. The system of claim 10, wherein the backend system comprises one or more of a server, a server blade, a server rack, a server farm, a distributed server, and a multi-node distributed processing network of computers.

17. The system of claim 10, wherein the mobile device is located within a proximate distance of the building that the user is securing an elevator call in, wherein the property manager is located off-site from the building, and wherein the backend system is located in a cloud environment connecting to the mobile device and property manager over one or more networks.

18. A computer program product for authorizing a user securing an elevator call in a building, the computer program product comprising a computer readable storage medium having program instructions embodied therewith, the program instructions executable by a processor to cause the processor to:
requesting, by a property manager, a secure authorization token that includes an expiration time from a backend system;
transmitting, from the property manager, the secure authorization token to a mobile device;
connecting a backend system to the mobile device using the secure authorization token;
verify, using the backend system, an authenticity of the secure authorization token from the mobile device based on at least the expiration time;
generate, at the backend system, a secure access token and a first random number in response to the authenticity of the secure authorization token being verified; and
send, to the mobile device, the secure access token and the first random number for use in making elevator call requests.

19. The computer program product of claim 18, further comprising additional program instructions executable by a processor to cause the processor to:
store, in a memory device of the mobile device, the secure access token and the first random number;
generate, at the mobile device, an elevator service request message based on a user input;
transmit, from the mobile device, the secure access token to the backend system in response to receiving the user input;
verify, at the backend system, the secure access token;
generate, at the backend system, a second random number in response to verifying the secure access token;
transmit, from the backend system, the second random number to the mobile device, wherein the mobile device stores the second random number;
transmit, from the mobile device, the first random number along with the elevator service request message to the backend system;
store, at the backend system, the elevator service request message received from the mobile device in response to the first random number being verified; and
transmit, from the backend system, the elevator service request message to an elevator controller to call an elevator car in response to the first random number and the secure access token being verified.

20. The computer program product of claim 18,
wherein receiving, at the mobile device, the secure authorization token that includes the expiration time comprises:
requesting, by a property manager, the secure authorization token from the backend system;
generating, using the backend system, the secure authorization token, wherein generating the secure authorization token uses the expiration time and one or more of an expiration date, a current date, a current time, a building identification, a current user location, a user type, and user preferences;
transmitting, from the backend system, the secure authorization token to the property manager; and transmitting, from the property manager, the secure authorization token to the mobile device.

\* \* \* \* \*